(12) United States Patent
Kasahara et al.

(10) Patent No.: US 11,260,993 B2
(45) Date of Patent: Mar. 1, 2022

(54) AIRCRAFT FUSELAGE ASSEMBLING JIG AND METHOD OF USING THE SAME

(71) Applicant: KAWASAKI JUKOGYO KABUSHIKI KAISHA, Kobe (JP)

(72) Inventors: Kenji Kasahara, Gifu (JP); Shuhei Segawa, Aisai (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 365 days.

(21) Appl. No.: 16/095,554

(22) PCT Filed: Apr. 20, 2017

(86) PCT No.: PCT/JP2017/015846
§ 371 (c)(1),
(2) Date: Oct. 22, 2018

(87) PCT Pub. No.: WO2017/183684
PCT Pub. Date: Oct. 26, 2017

(65) Prior Publication Data
US 2019/0127088 A1 May 2, 2019

(30) Foreign Application Priority Data
Apr. 20, 2016 (JP) .............................. JP2016-084349

(51) Int. Cl.
*B64F 5/10* (2017.01)
*B64C 1/12* (2006.01)
(Continued)

(52) U.S. Cl.
CPC ................ *B64F 5/10* (2017.01); *B23P 19/00* (2013.01); *B23P 21/00* (2013.01); *B64C 1/06* (2013.01);
(Continued)

(58) Field of Classification Search
CPC ........... B64C 1/06; B64C 1/061; B64C 1/064; B64C 1/12; B21J 15/28; B21J 15/142;
(Continued)

(56) References Cited

U.S. PATENT DOCUMENTS 6,430,796 B1 * 8/2002 Jones ....................... B21J 15/10
29/243.53
7,874,052 B2 * 1/2011 Schueler ............... B23B 47/287
29/281.5

(Continued)

FOREIGN PATENT DOCUMENTS

EP 2979810 A1 2/2016
JP 2013-198918 A 10/2013
(Continued)

OTHER PUBLICATIONS

Handa, Kunio "Aircraft Manufacturing Engineering" pp. 239-244.
Jul. 11, 2017 International Search Report issued in International Patent Application No. PCT/JP2017/015846.

*Primary Examiner* — Christopher J Besler
*Assistant Examiner* — Christine Bersabal
(74) *Attorney, Agent, or Firm* — Oliff PLC

(57) ABSTRACT

An aircraft fuselage assembling jig includes: a base provided with a plurality of frame indexes for positioning both ends of a plurality of aircraft fuselage frames; a plurality of header plates, each of which protrudes from the base so as to extend along an aircraft fuselage panel, the header plates being arranged parallel to each other in an axial direction of the aircraft fuselage panel; and a plurality of electric cylinders radially provided on each of the plurality of header plates, the electric cylinders moving respective receiving members in a radial direction of the aircraft fuselage panel, the receiving members contacting a skin included in the aircraft fuselage panel.

11 Claims, 9 Drawing Sheets

(51) Int. Cl.
    *B23P 21/00*         (2006.01)
    *B64C 1/06*          (2006.01)
    *B23P 19/00*         (2006.01)

(52) U.S. Cl.
    CPC .............. *B64C 1/061* (2013.01); *B64C 1/064* (2013.01); *B64C 1/12* (2013.01); *B23P 2700/01* (2013.01)

(58) Field of Classification Search
    CPC ........ B64F 5/10; B23P 2700/01; B23P 21/00; B23P 19/00
    See application file for complete search history.

(56)            References Cited

U.S. PATENT DOCUMENTS 9,051,062 B1      6/2015  Boone et al.
    2019/0030588 A1*  1/2019  Hirai ..................... B21J 15/142

FOREIGN PATENT DOCUMENTS

JP       2014-195855 A      10/2014
    JP        2017136931 A  *    8/2017  ............... B64C 1/12

* cited by examiner

AIRCRAFT FUSELAGE ASSEMBLING JIG AND METHOD OF USING THE SAME

TECHNICAL FIELD

The present invention relates to an aircraft fuselage assembling jig used when joining a plurality of aircraft fuselage frames to an aircraft fuselage panel, and to a method of using the aircraft fuselage assembling jig.

BACKGROUND ART

Among middle- and large-sized aircrafts, there is an aircraft whose fuselage is manufactured by coupling together a plurality of panel assemblies that are divided from each other in the circumferential direction. Each panel assembly is formed by joining a plurality of aircraft fuselage frames to an aircraft fuselage panel.

When joining the plurality of aircraft fuselage frames to the aircraft fuselage panel, extremely precise positioning of these components is necessary. Therefore, an aircraft fuselage assembling jig fabricated with high precision and having high stiffness is used (see Non-Patent Literature 1, for example). As one example, required precision of the positioning of components relative to the aircraft fuselage panel is at least ±0.25 mm even if the size of the panel is 10 m. In order to realize such precision, the aircraft fuselage assembling jig needs to be fabricated with a precision of about ±0.13 mm.

A conventional aircraft fuselage assembling jig includes: a jig body having a framing structure; a plurality of frame indexes for positioning aircraft fuselage frames, the frame indexes being fixed to the jig body; and a plurality of contour bars for positioning a skin included in an aircraft fuselage panel, the contour bars being fixed to the jig body. When using the assembling jig, first, the aircraft fuselage frames are fixed to the frame indexes. Then, the aircraft fuselage panel is placed over the aircraft fuselage frames, such that the overall skin of the aircraft fuselage panel contacts the contour bars. Thereafter, shear ties and clips, which are included in the aircraft fuselage panel, and the aircraft fuselage frames are subjected to hole machining together, and then fastened together by rivets.

CITATION LIST

Non-Patent Literature

NPL 1: "Koukuuki Seisan Kougaku (Aircraft Production Engineering)", authored by Kunio Handa, published by Office HANS on Oct. 20, 2002, pp. 239 to 244.

SUMMARY OF INVENTION

Technical Problem

However, in such a conventional aircraft fuselage assembling jig, all the contour bars are designed in accordance with the curvature of the skin of a single aircraft fuselage panel. Therefore, the jig cannot be used for a different aircraft fuselage panel. That is, the same number of aircraft fuselage assembling jigs as the number of aircraft fuselage panels need to be prepared.

In view of the above, an object of the present invention is to provide an aircraft fuselage assembling jig usable for a plurality of aircraft fuselage panels and to provide a method of using the aircraft fuselage assembling jig.

Solution to Problem

In order to solve the above-described problems, an aircraft fuselage assembling jig according to the present invention includes: a base provided with a plurality of frame indexes for positioning both ends of a plurality of aircraft fuselage frames; a plurality of header plates, each of which protrudes from the base so as to extend along an aircraft fuselage panel, the header plates being arranged parallel to each other in an axial direction of the aircraft fuselage panel; and a plurality of electric cylinders radially provided on each of the plurality of header plates, the electric cylinders moving respective receiving members in a radial direction of the aircraft fuselage panel, the receiving members contacting a skin included in the aircraft fuselage panel.

According to the above configuration, in a case where the aircraft fuselage assembling jig is used for a plurality of aircraft fuselage panels whose skins have different curvatures from each other, the receiving members can be disposed, for each aircraft fuselage panel, at positions that match the curvature of the skin by adjusting the strokes of the electric cylinders. In addition, the strokes of the electric cylinders can be adjusted very highly precisely. Therefore, the aircraft fuselage assembling jig can be used for the plurality of aircraft fuselage panels.

The aircraft fuselage panel may have at least two types of shear tie arrangement patterns. The plurality of frame indexes may include a plurality of movable frame indexes, each of which moves in the axial direction of the aircraft fuselage panel between a first position and a second position, the first position corresponding to one of the two types of shear tie arrangement patterns, the second position corresponding to the other type of shear tie arrangement pattern. According to this configuration, when using the movable frame indexes, the position of each of the movable frame indexes can be switched between the first position and the second position in accordance with the shear tie arrangement pattern.

The base may include a pair of side beams extending in the axial direction of the aircraft fuselage panel, the pair of side beams being provided with the plurality of frame indexes, and each of the pair of side beams may be provided with at least one frame index actuator that moves the plurality of movable frame indexes between the first position and the second position. According to this configuration, the position of each of the movable frame indexes can be readily switched between the first position and the second position.

The aircraft fuselage panel may have at least two types of stringer arrangement patterns. At least one of the plurality of header plates may be provided with: a first stringer index that moves between an engagement position and a non-engagement position, the engagement position being a position at which the first stringer index engages with one stringer in one of the two types of stringer arrangement patterns; and a second stringer index that moves between an engagement position and a non-engagement position, the engagement position being a position at which the second stringer index engages with one stringer in the other type of stringer arrangement pattern. According to this configuration, the stringer index to use can be switched between the first stringer index and the second stringer index in accordance with the stringer arrangement pattern.

At least one of the plurality of header plates may be provided with: a first stringer index actuator that moves the first stringer index between the engagement position and the non-engagement position; and a second stringer index actuator that moves the second stringer index between the engagement position and the non-engagement position. According to this configuration, the switch between the first stringer index and the second stringer index can be readily made.

The above aircraft fuselage assembling jig may further include an end plate that protrudes, outside the aircraft fuselage panel, from the base so as to extend along the aircraft fuselage panel. The aircraft fuselage panel may have at least two types of skin edge patterns. The end plate may be provided with: a first edge index that moves between a contact position and a non-contact position, the contact position being a position at which the first edge index contacts an edge of the skin in one of the two types of skin edge patterns; and a second edge index that moves between a contact position and a non-contact position, the contact position being a position at which the second edge index contacts the edge of the skin in the other type of skin edge pattern. According to this configuration, the edge index to use can be switched between the first edge index and the second edge index in accordance with the skin edge pattern.

The end plate may be provided with: a first edge index actuator that moves the first edge index between the contact position and the non-contact position; and a second edge index actuator that moves the second edge index between the contact position and the non-contact position. According to this configuration, the switch between the first edge index and the second edge index can be readily made.

The plurality of header plates may protrude upward from the base. In a case where the plurality of header plates protrude laterally from the base, the aircraft fuselage panel set on the aircraft fuselage assembling jig is in an upright standing state. In this case, the lower part of the aircraft fuselage panel deforms due to the weight of the aircraft fuselage panel, and for this reason, the skin of the lower part of the aircraft fuselage panel does not contact the receiving members. Therefore, it is necessary to use a band or the like to correct the deformation of the aircraft fuselage panel so as to bring the skin into contact with the receiving members. On the other hand, in a case where the plurality of header plates protrude upward from the base, the aircraft fuselage panel set on the aircraft fuselage assembling jig is in a laid-down state. Accordingly, the weight of the aircraft fuselage panel brings the overall skin into contact with the receiving members. Thus, deformation correction of the aircraft fuselage panel is unnecessary.

The above aircraft fuselage assembling jig may further include an electric cylinder provided on the base, the electric cylinder correcting deflection of an end portion of the aircraft fuselage panel between the plurality of header plates. According to this configuration, even in a case where the distance between the header plates is great, the end portion of the aircraft fuselage panel can be kept in a desirable shape.

A method of using an aircraft fuselage assembling jig according to the present invention is a method of using the above-described aircraft fuselage assembling jig, and the method includes: while measuring receiving surfaces of the respective receiving members by using a laser tracker, determining an origin of each of the plurality of electric cylinders by operating the plurality of electric cylinders, such that the receiving surfaces of all the receiving members are positioned on an imaginary reference cylindrical surface that defines a diameter of the aircraft fuselage; and moving the receiving members to respective design positions by driving each of the plurality of electric cylinders from the origin by a predetermined stroke.

According to the above method, the positions of the receiving surfaces of the receiving members are assured by the precision of the strokes of the electric cylinders. Therefore, it is not necessary to measure, by using the laser tracker, the receiving surfaces of the receiving members moved to the design positions each time the aircraft fuselage panel is changed. Thus, the cost for the assurance of final assembling precision of a panel assembly can be reduced.

A target bushing may be embedded in a side surface of each receiving member. In the step of determining the origin of each electric cylinder, a position of the target bushing may be measured by using the laser tracker, and the measured position of the target bushing may be recorded as a reference position. The method may include, at regular inspection, after moving each of the plurality of electric cylinders to the origin, measuring the position of the target bushing by using the laser tracker, and comparing the measured position of the target bushing with the reference position of the target bushing, which is recorded when determining the origin. Assume that, at the regular inspection, the receiving surfaces of the receiving members are measured by using the laser tracker in a state where the electric cylinders are each returned to the origin. In this case, each time the regular inspection is performed, the inspection requires a very high cost. In this respect, the cost for the regular inspection can be reduced by adopting the following method: when determining the origin, record the position of the target bushing as a reference position; and at the regular inspection, measure the position of the target bushing and compare it with the reference position.

Advantageous Effects of Invention

The present invention provides an aircraft fuselage assembling jig usable for a plurality of aircraft fuselage panels.

DESCRIPTION OF EMBODIMENTS

Figure 1:
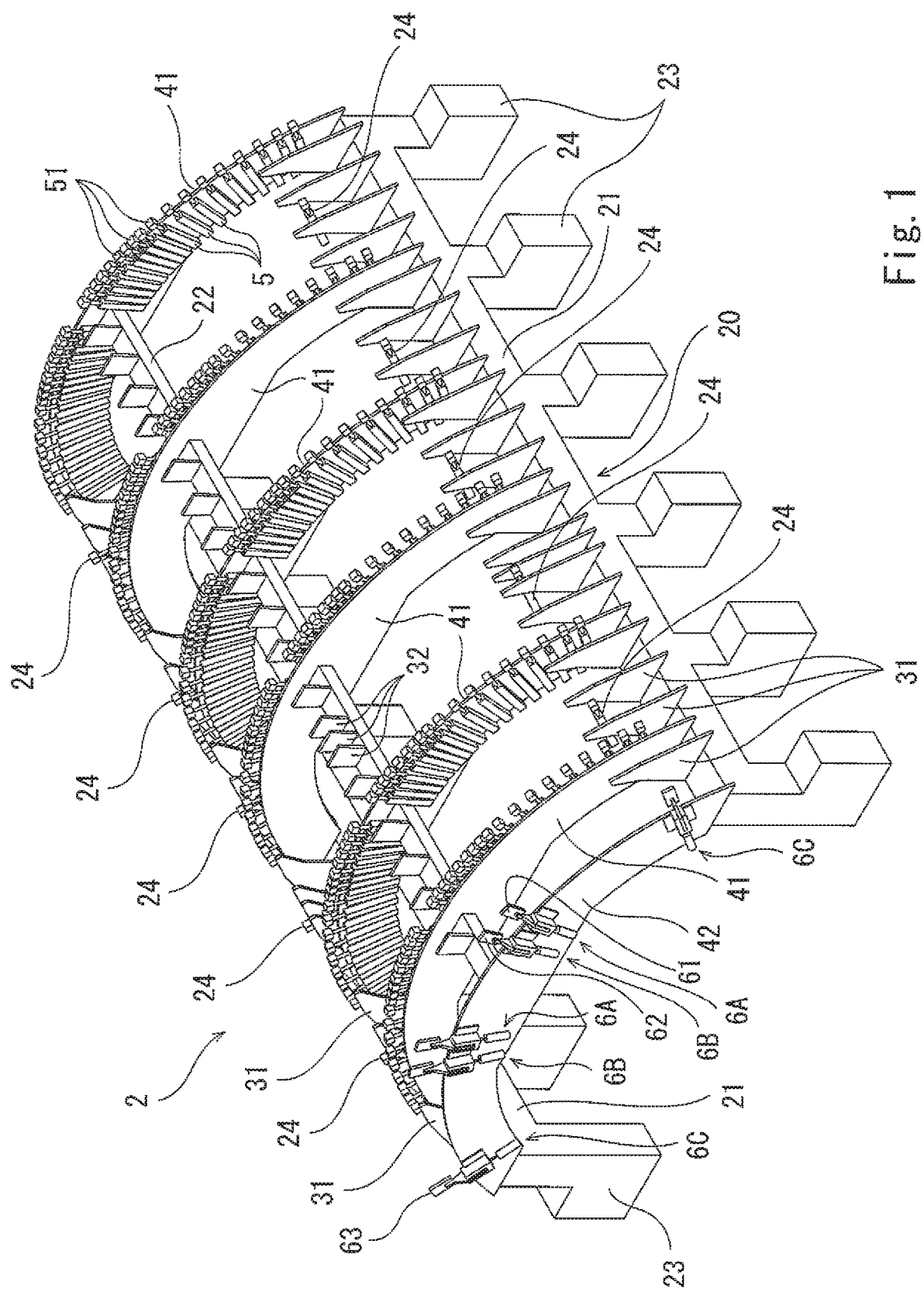
FIG. 1 is a perspective view of an aircraft fuselage assembling jig according to one embodiment of the present invention.
Figure 2A:
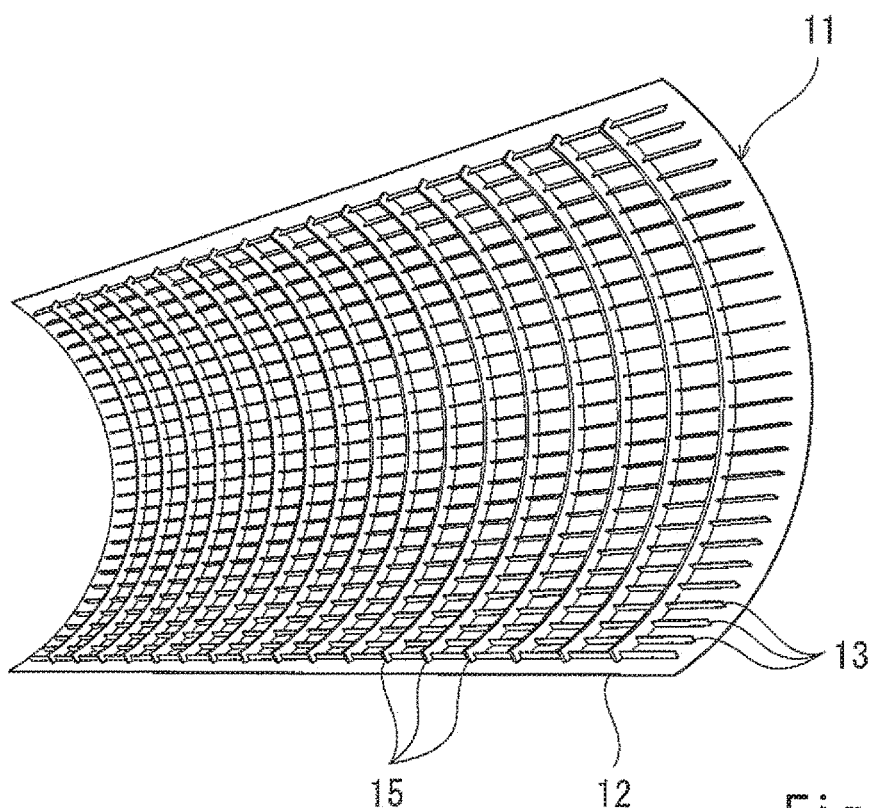
FIG. 2A is an inside perspective view of a panel assembly in which a plurality of aircraft fuselage frames are joined to an aircraft fuselage panel.

FIG. 1 shows an aircraft fuselage assembling jig 2 according to one embodiment of the present invention. The aircraft fuselage assembling jig 2 is used when joining a plurality of aircraft fuselage frames 15 to an aircraft fuselage panel 11 as shown in FIG. 2A.

Figure 2B:
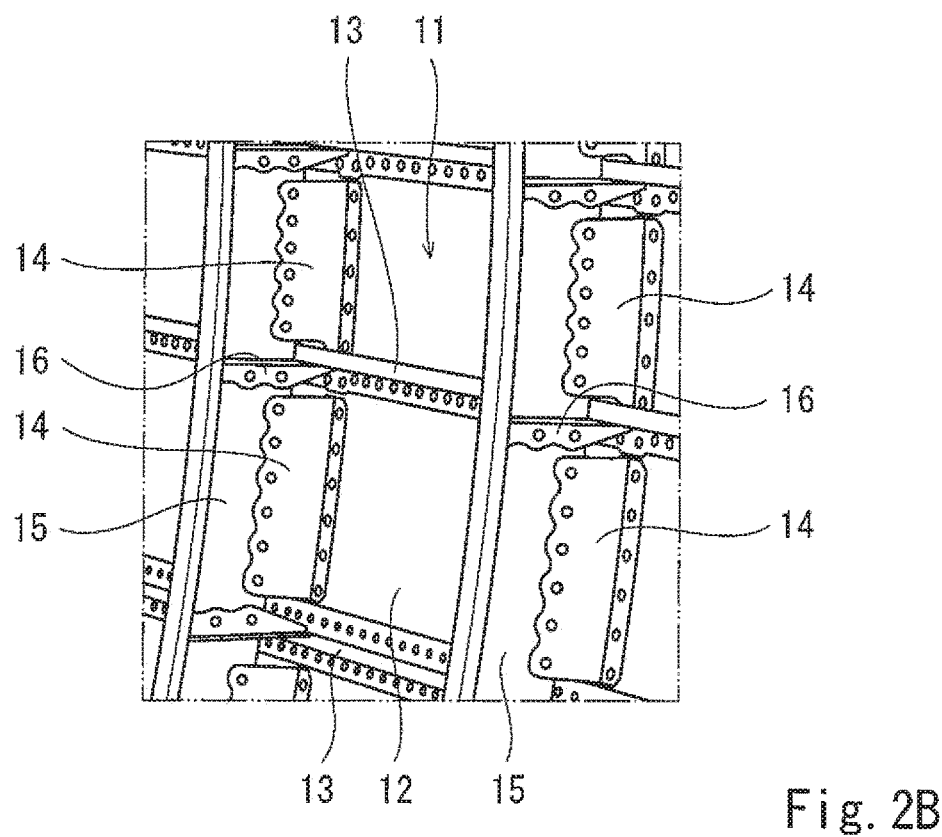
FIG. 2B is an enlarged view of a part of FIG. 2A.

The longitudinal direction of the aircraft fuselage is defined herein as the axial direction of the aircraft fuselage panel 11; the direction extending radially from the central axis of the aircraft fuselage is defined herein as the radial direction of the aircraft fuselage panel 11; and the direction rotating about the central axis of the aircraft fuselage is defined herein as the circumferential direction of the aircraft fuselage panel 11. As shown in FIGS. 2A and 2B, the aircraft fuselage panel 11 includes: a skin 12; and a plurality of stringers 13 and a plurality of shear ties 14 both fixed to the inner surface of the skin 12 by rivets. The stringers 13 extend in the axial direction of the aircraft fuselage panel 11. The shear ties 14 are disposed between the stringers 13 adjacent to each other, such that a plurality of shear tie lines are formed orthogonally to the stringers 13. Between the shear ties 14, clips 16 are fixed to the stringers 13 by rivets. Each of the aircraft fuselage frames 15 is fastened to the shear ties 14 and the clips 16 of a corresponding one of the shear tie lines by rivets.

Returning to FIG. 1, the aircraft fuselage assembling jig 2 includes a base 20, which is in such a size that the base 20 can support the aircraft fuselage panel 11. In the present embodiment, the aircraft fuselage assembling jig 2 is a horizontal type jig. Accordingly, the base 20 overlaps the aircraft fuselage panel 11 when seen in the vertical direction. Specifically, the base 20 includes a pair of side beams 21 extending in the axial direction of the aircraft fuselage panel 11 and a plurality of support pillars 23 supporting each of the side beams 21.

Between the pair of side beams 21, a plurality of header plates 41 are disposed, each of which extends between the side beams 21 in a bridging manner. These header plates 41 are arranged parallel to each other in the axial direction of the aircraft fuselage panel 11. Each of the header plates 41 protrudes upward from the base 20 so as to extend along the aircraft fuselage panel 11.

Further, between the pair of side beams 21, a center beam 22 is provided such that the center beam 22 crosses all the header plates 41. Similar to the side beams 21, the center beam 22 extends in the axial direction of the aircraft fuselage panel 11.

The pair of side beams 21 is provided with a plurality of first frame indexes 31 for positioning both ends of each aircraft fuselage frame 15. The center beam 22 is provided with a plurality of second frame indexes 32 for positioning the substantial center of each aircraft fuselage frame 15.

Figure 6:
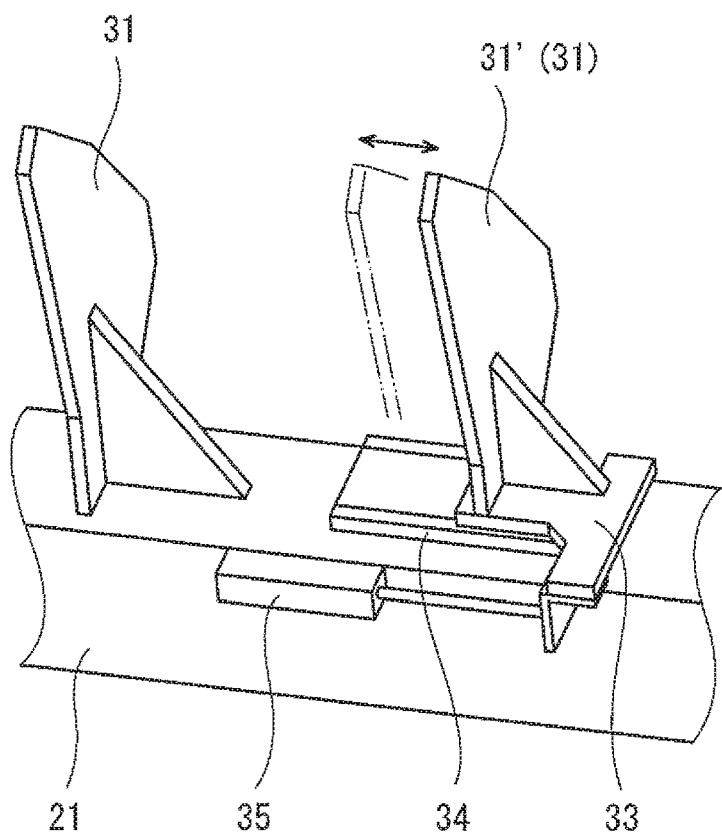
FIG. 6 is a perspective view of a movable frame index among first frame indexes.
Figure 7:
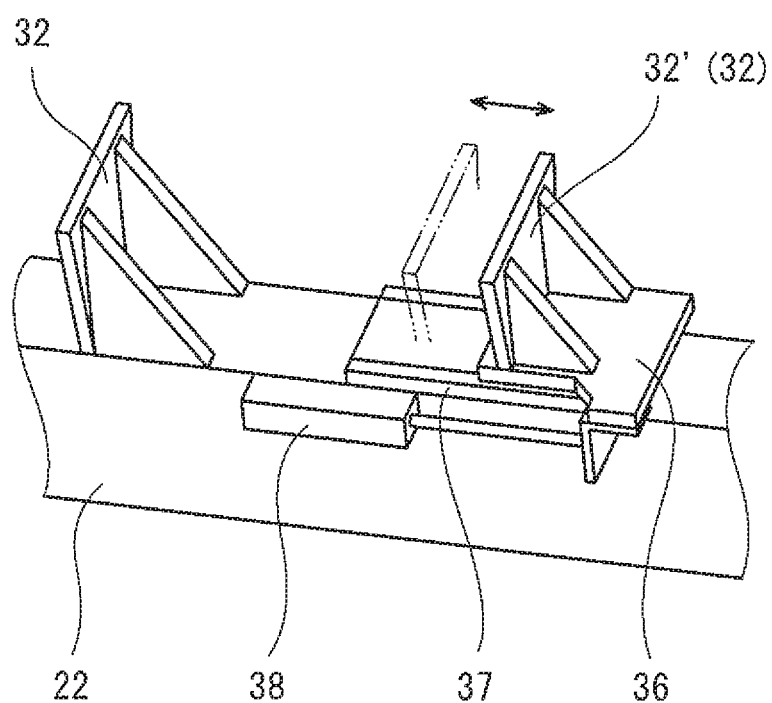
FIG. 7 is a perspective view of a movable frame index among second frame indexes.

In the present embodiment, the aircraft fuselage panel 11 has two types of shear tie arrangement patterns. Accordingly, as shown in FIG. 6, some of the first frame indexes 31 are movable frame indexes 31'. Similarly, as shown in FIG. 7, some of the second frame indexes 32 are movable frame indexes 32'. It should be noted that the movable frame indexes 32' of the second frame indexes 32 are disposed at the same positions as those of the movable frame indexes 31' of the first frame indexes 31 in the axial direction of the aircraft fuselage panel 11.

As shown in FIG. 6, the first frame indexes 31 except the movable frame indexes 31' are directly fixed to the side beams 21. On the other hand, each of the movable frame indexes 31' of the first frame indexes 31 is fixed to a base 33, which is supported by a slide mechanism 34 such that the base 33 is slidable in the axial direction of the aircraft fuselage panel 11. The side beams 21 are further provided with first frame index actuators 35, and the bases 33 are coupled to movable parts of the respective first frame index actuators 35.

Each of the first frame index actuators 35 is a pneumatic cylinder, for example. Alternatively, each first frame index actuator 35 may be a hydraulic cylinder or an electric cylinder. The first frame index actuator 35 moves the movable frame index 31' via the base 33 in the axial direction of the aircraft fuselage panel 11 between a first position and a second position. The first position (the position indicated by solid line in FIG. 6) corresponds to one type of shear tie arrangement pattern. The second position (the position indicated by two-dot chain line in FIG. 6) corresponds to the other type of shear tie arrangement pattern. The first position and the second position are both stroke ends of the first frame index actuator 35.

It should be noted that if the movable frame indexes 31' are only those arranged continuously, then the movable frame indexes 31' may be fixed to a shared base 33, and the base 33 may be driven by one first frame index actuator 35. That is, it will suffice if each of the side beams 21 is provided with at least one first frame index actuator 35.

Similarly, as shown in FIG. 7, the second frame indexes 32 except the movable frame indexes 32' are directly fixed to the center beam 22. On the other hand, each of the movable frame indexes 32' of the second frame indexes 32 is fixed to a base 36, which is supported by a slide mechanism 37 such that the base 36 is slidable in the axial direction of the aircraft fuselage panel 11. The center beam 22 is further provided with second frame index actuators 38, and the bases 36 are coupled to movable parts of the respective second frame index actuators 38.

Each of the second frame index actuators 38 is a pneumatic cylinder, for example. Alternatively, each second frame index actuator 38 may be a hydraulic cylinder or an electric cylinder. The second frame index actuator 38 moves the movable frame index 32' via the base 36 in the axial direction of the aircraft fuselage panel 11 between a first position and a second position. The first position (the position indicated by solid line in FIG. 7) corresponds to the one type of shear tie arrangement pattern. The second position (the position indicated by two-dot chain line in FIG. 7) corresponds to the other type of shear tie arrangement pattern. The first position and the second position are both stroke ends of the second frame index actuator 38.

It should be noted that if the movable frame indexes 32' are only those arranged continuously, then the movable frame indexes 32' may be fixed to a shared base 36, and the base 36 may be driven by one second frame index actuator 38. That is, it will suffice if the center beam 22 is provided with at least one second frame index actuator 38.

Figure 4:
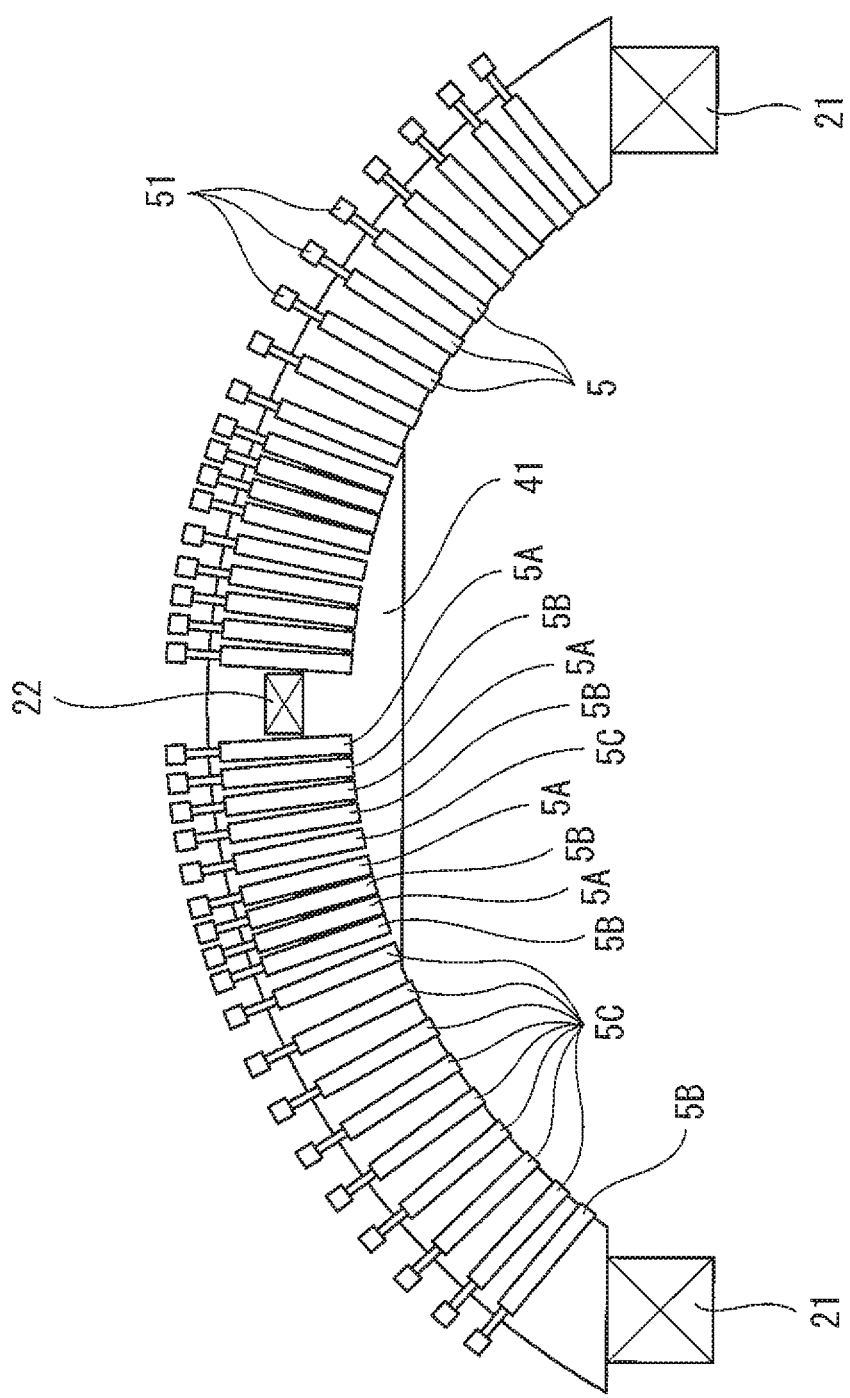
FIG. 4 is a front view of a header plate.

As shown in FIG. 4, a plurality of electric cylinders 5 are radially provided on each of the header plates 41. The axial direction of each electric cylinder 5 coincides with the radial direction of the aircraft fuselage panel 11.

In the present embodiment, the aircraft fuselage panel 11 has two types of skin patterns. Accordingly, the electric cylinders 5 include: first electric cylinders 5A used only in one type of skin pattern; second electric cylinders 5B used only in the other type of skin pattern; and third electric cylinders 5C used in both the two types of skin patterns. The first to third electric cylinders 5A to 5C are arranged symmetrically. FIG. 4 shows one example of the arrangement/layout of the first to third electric cylinders 5A to 5C. The arrangement/layout of the first to third electric cylinders 5A to 5C is of course not limited to this example. The aircraft fuselage panel 11 may have three or more types of skin patterns.

Figure 5:
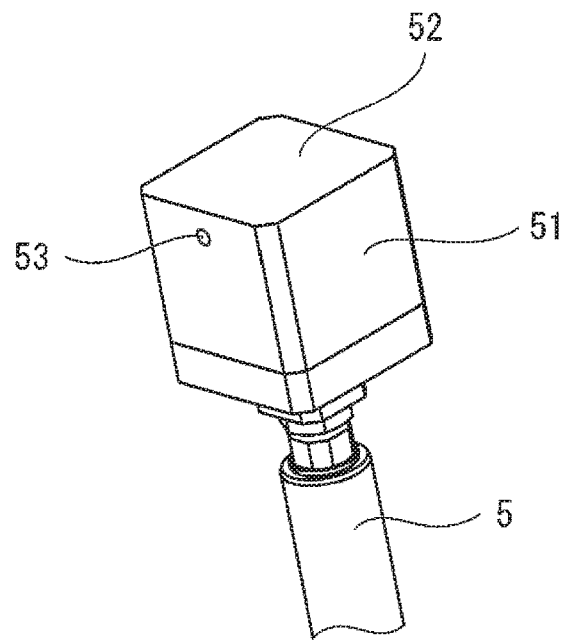
FIG. 5 is a perspective view a receiving member.

Each electric cylinder 5 moves a receiving member 51, which contacts the skin 12 of the aircraft fuselage panel 11, in the radial direction of the aircraft fuselage panel 11. As shown in FIG. 5, the receiving member 51 is block-shaped, and has a receiving surface 52 facing the opposite direction of the electric cylinder 5. A target bushing 53 is embedded in a side surface of the receiving member 51. The target bushing 53 is used at regular inspection, which will be described below.

Figure 8:
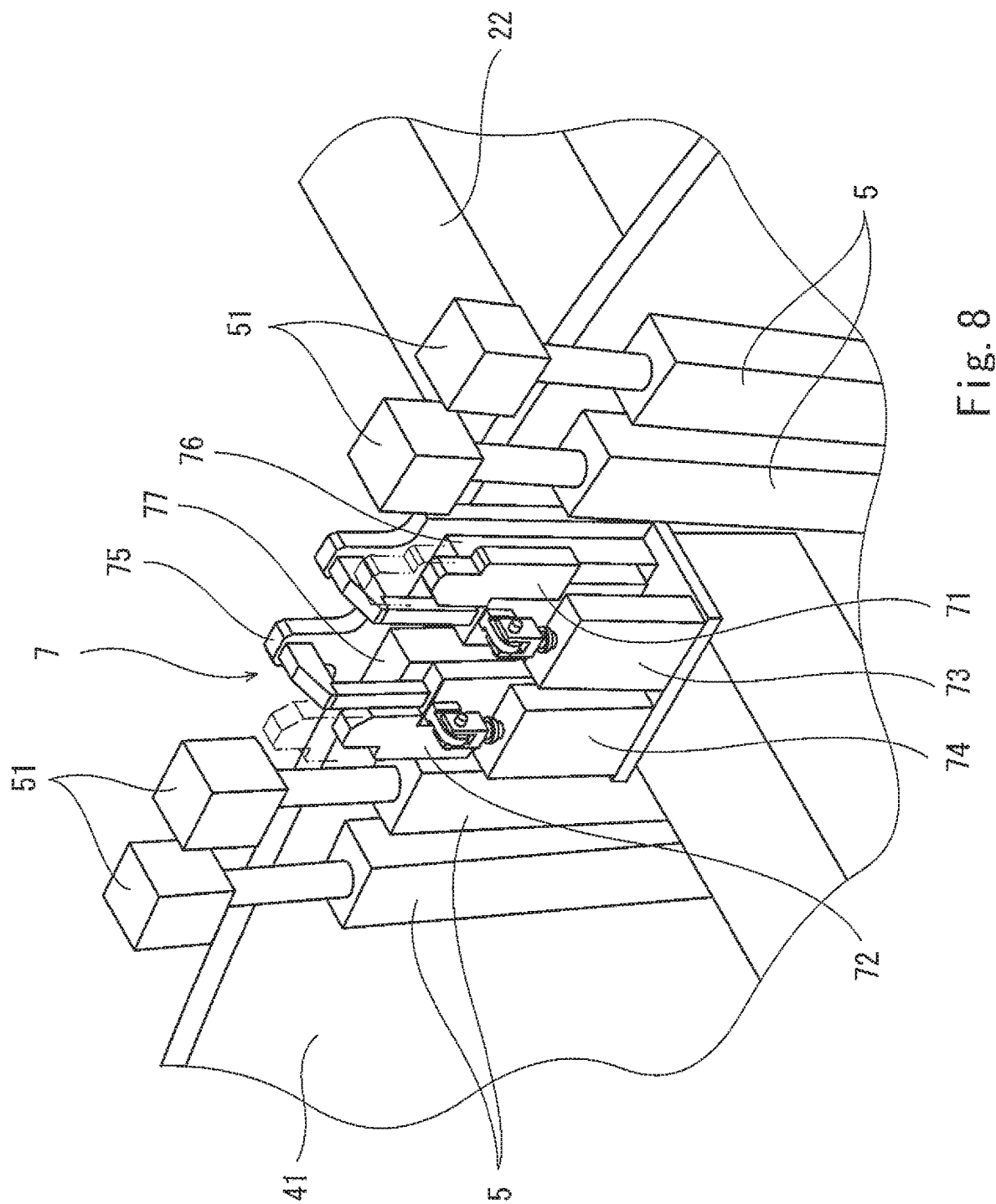
FIG. 8 is a perspective view around first and second stringer indexes.

In the present embodiment, the aircraft fuselage panel 11 has two types of stringer arrangement patterns. Accordingly, each of the header plates 41 is provided with a stringer positioning device 7 shown in FIG. 8 (FIG. 1, FIG. 3, and FIG. 4 do not show the stringer positioning devices 7 for the purpose of simplifying the drawings). However, it is not essential that all the header plates 41 be provided with the stringer positioning devices 7. It will suffice if at least one header plate 41 is provided with the stringer positioning device 7.

The stringer positioning device 7 includes: a first stringer index 71 for engaging with one stringer 13 in one type of stringer arrangement pattern; and a second stringer index 72 for engaging with one stringer 13 in the other type of stringer arrangement pattern. The first stringer index 71 is supported by a first slide mechanism 76, such that the first stringer index 71 is slidable in the radial direction of the aircraft fuselage panel 11. The second stringer index 72 is supported by a second slide mechanism 77, such that the second stringer index 72 is slidable in the radial direction of the aircraft fuselage panel 11. The first slide mechanism 76 and the second slide mechanism 77 are mounted to a bracket 75 fixed to the header plate 41.

The first stringer index 71 is coupled to a movable part of a first stringer index actuator 73, and the second stringer index 72 is coupled to a movable part of a second stringer index actuator 74. The first stringer index actuator 73 and the second stringer index actuator 74 are mounted to the aforementioned bracket 75.

The first stringer index actuator 73 and the second stringer index actuator 74 are pneumatic cylinders, for example. Alternatively, the first stringer index actuator 73 and the second stringer index actuator 74 may be hydraulic cylinders or electric cylinders. The first stringer index actuator 73 moves the first stringer index 71 between a radially outward engagement position (the position indicated by two-dot chain line in FIG. 8) and a radially inward non-engagement position (the position indicated by solid line in FIG. 8). The engagement position and the non-engagement position are both stroke ends of the first stringer index actuator 73. When the first stringer index 71 moves to the engagement position, the first stringer index 71 engages with one stringer 13 in the one type of stringer arrangement pattern. The second stringer index actuator 74 moves the second stringer index 72 between a radially outward engagement position (the position indicated by two-dot chain line in FIG. 8) and a radially inward non-engagement position (the position indicated by solid line in FIG. 8). The engagement position and the non-engagement position are both stroke ends of the second stringer index actuator 74. When the second stringer index 72 moves to the engagement position, the second stringer index 72 engages with one stringer 13 in the other type of stringer arrangement pattern.

Returning to FIG. 1, between the pair of side beams 21, an end plate 42 is disposed, which extends between end portions of the side beams 21 in a bridging manner. The end plate 42 is parallel to the header plates 41, and outside the aircraft fuselage panel 11, the end plate 42 protrudes upward from the base 20 so as to extend along the aircraft fuselage panel 11. An end portion of the aforementioned center beam 22 is joined to the end plate 42.

In the present embodiment, the aircraft fuselage panel 11 has two types of skin edge patterns. Accordingly, the end plate 42 is provided with: two first skin edge positioning devices 6A used only in one type of skin edge pattern; two second skin edge positioning devices 6B used only in the other type of skin edge pattern; and two third skin edge positioning devices 6C used in both the two types of skin edge patterns. The third skin edge positioning devices 6C are disposed on both end portions of the end plate 42. The first skin edge positioning devices 6A and the second skin edge positioning devices 6B are disposed at such positions that the space between the third skin edge positioning devices 6C is trisected substantially equally.

Figure 9:
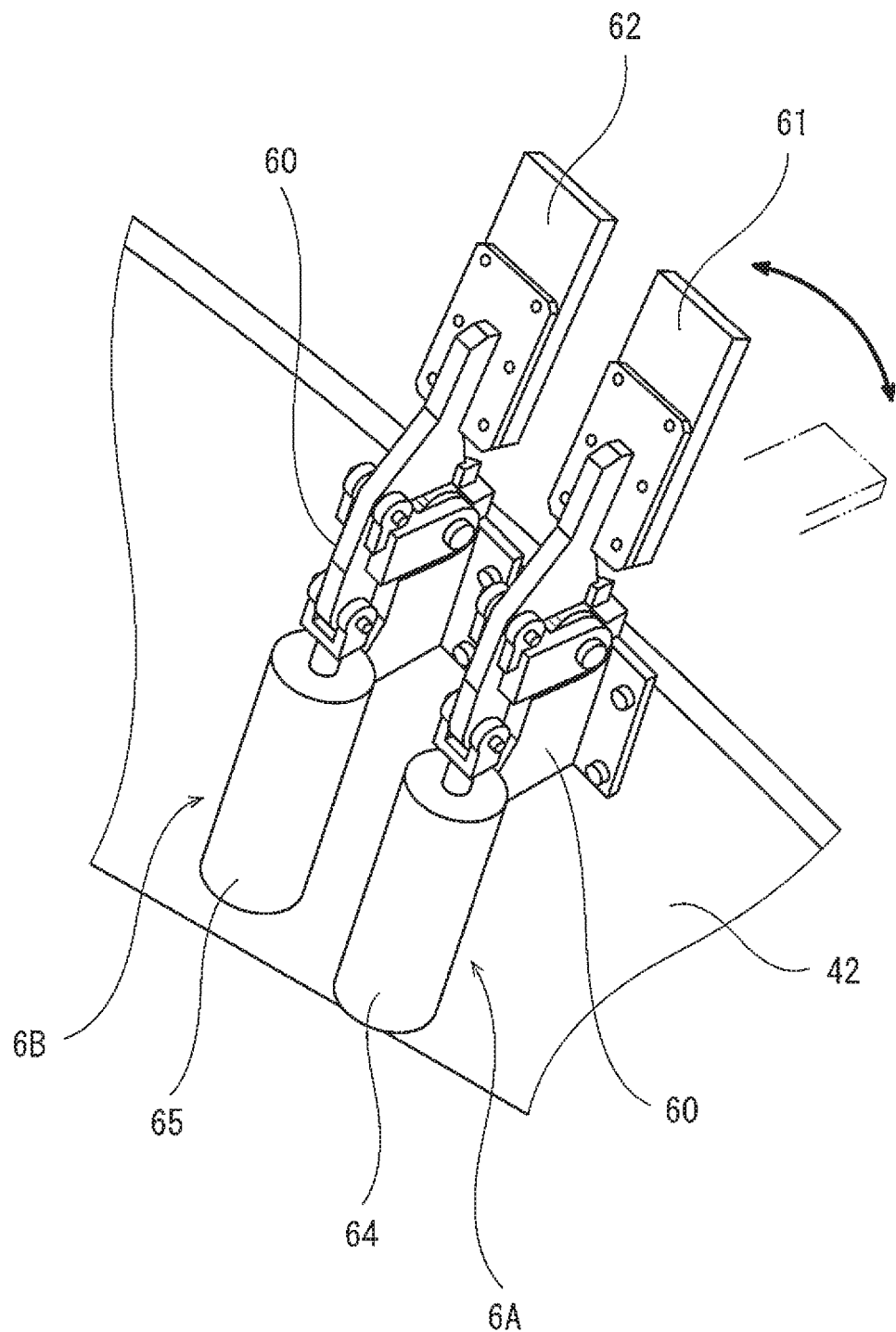
FIG. 9 is a perspective view around first and second edge indexes.

As shown in FIG. 9, each of the first skin edge positioning devices 6A includes: a first edge index 61 for contacting the edge of the skin 12 in the one type of skin edge pattern; and a first edge index actuator 64 for operating the first edge index 61. The first edge index actuator 64 is coupled to the first edge index 61 via a toggle mechanism 60 fixed to the end plate 42.

The first edge index actuator 64 is a pneumatic cylinder, for example. Alternatively, the first edge index actuator 64 may be a hydraulic cylinder or an electric cylinder. The first edge index actuator 64 moves the first edge index 61 between a contact position and a non-contact position. When the first edge index 61 is at the contact position (the position indicated by two-dot chain line in FIG. 9), the first edge index 61 contacts the edge of the skin 12 in such a manner that the first edge index 61 and the skin 12 are butted with each other. When the first edge index 61 is at the non-contact position (the position indicated by solid line in FIG. 9), the first edge index 61 is substantially parallel to the end plate 42. The contact position and the non-contact position are both stroke ends of the first edge index actuator 64.

Similarly, each of the second skin edge positioning devices 6B includes: a second edge index 62 for contacting the edge of the skin 12 in the other type of skin edge pattern; and a second edge index actuator 65 for operating the second edge index 62. The second edge index actuator 65 is coupled to the second edge index 62 via a toggle mechanism 60 fixed to the end plate 42.

The second edge index actuator 65 is a pneumatic cylinder, for example. Alternatively, the second edge index actuator 65 may be a hydraulic cylinder or an electric cylinder. The second edge index actuator 65 moves the second edge index 62 between a contact position and a non-contact position. When the second edge index 62 is at the contact position, the second edge index 62 contacts the edge of the skin 12 in such a manner that the second edge index 62 and the skin 12 are butted with each other. When the second edge index 62 is at the non-contact position (the position indicated by solid line in FIG. 9), the second edge index 62 is substantially parallel to the end plate 42. The contact position and the non-contact position are both stroke ends of the second edge index actuator 65.

Figure 3:
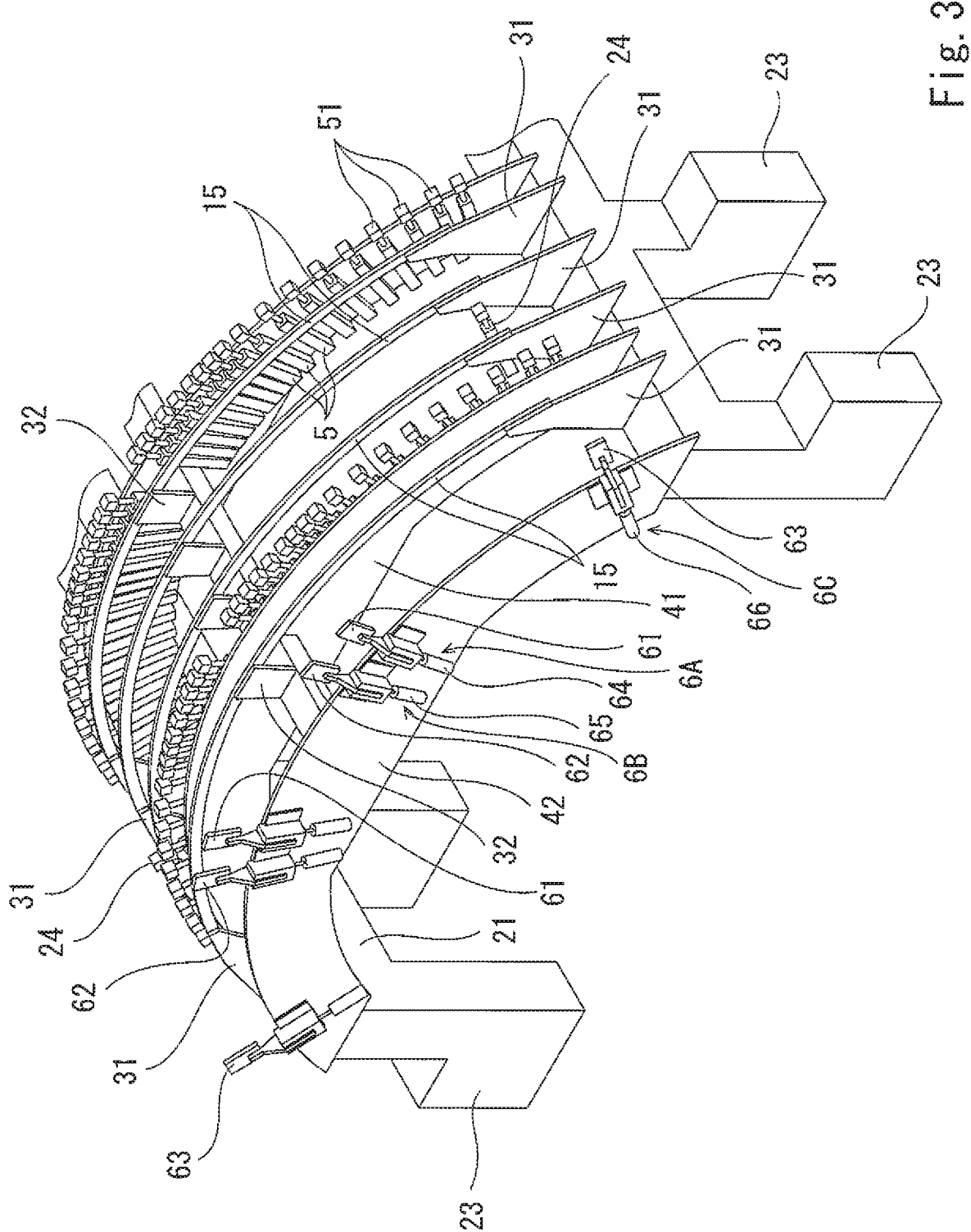
FIG. 3 is an enlarged view of an end portion of the aircraft fuselage assembling jig, on which the plurality of aircraft fuselage frames are set.

Meanwhile, as shown in FIG. 3, each of the third skin edge positioning devices 6C includes: a third edge index 63 for contacting the edge of the skin 12 in both the two types of skin edge patterns; and a third edge index actuator 66 for operating the third edge index 63. The third edge index actuator 66 is coupled to the third edge index 63 via a toggle mechanism 60 fixed to the end plate 42.

The third edge index actuator 66 is a pneumatic cylinder, for example. Alternatively, the third edge index actuator 66 may be a hydraulic cylinder or an electric cylinder. The third edge index actuator 66 moves the third edge index 63 between a contact position and a non-contact position. When the third edge index 63 is at the contact position, the third edge index 63 contacts the edge of the skin 12 in such a manner that the third edge index 63 and the skin 12 are butted with each other. When the third edge index 63 is at the non-contact position, the third edge index 63 is substantially parallel to the end plate 42. The contact position and the non-contact position are both stroke ends of the third edge index actuator 66.

Further, in the present embodiment, as shown in FIG. 1, a plurality of electric cylinders 24 are disposed between all header plates 41 near each of the side beams 21. These electric cylinders 24 are provided on the side beams 21 via unshown brackets, such that the axial direction of each electric cylinder 24 coincides with the radial direction of the aircraft fuselage panel 11. Each electric cylinder 24 serves to correct deflection of an end portion of the aircraft fuselage panel 11 between header plates 41 adjacent to each other.

Next, a method of using the aircraft fuselage assembling jig 2 is described.

First, as shown in FIG. 3, the aircraft fuselage frames 15 are set on the aircraft fuselage assembling jig 2. At the time, each aircraft fuselage frame 15 is fixed to the first frame indexes 31 and the second frame indexes 32, and thereby positioned at its normal position.

Then, the electric cylinders 5 are operated so as to dispose the receiving members 51 at design positions for positioning the skin 12 of the aircraft fuselage panel 11. Thereafter, the aircraft fuselage panel 11 is placed over the aircraft fuselage frames 15, such that the overall skin 12 of the aircraft fuselage panel 11 contacts the receiving members 51. At the time, either the first stringer indexes 71 or the second stringer indexes 72 are moved to their engagement positions, and also, the third edge indexes 63 and either the first edge indexes 61 or the second edge indexes 62 are moved to their contact positions. By using these indexes, the aircraft fuselage panel 11 is positioned at its normal position.

Thereafter, the shear ties 14 and the clips 16, which are included in the aircraft fuselage panel 11, and the aircraft fuselage frames 15 are subjected to hole machining together, and then fastened together by rivets.

According to the aircraft fuselage assembling jig 2 of the present embodiment described above, in a case where the aircraft fuselage assembling jig 2 is used for a plurality of aircraft fuselage panels 11 whose skins 12 have different curvatures from each other, the receiving members 51 can be disposed, for each aircraft fuselage panel 11, at positions that match the curvature of the skin 12 by adjusting the strokes of the electric cylinders 5. In addition, the strokes of the electric cylinders 5 can be adjusted very highly precisely. Therefore, the aircraft fuselage assembling jig 2 can be used for the plurality of aircraft fuselage panels 11.

Further, in the present embodiment, the movable frame indexes 31' and 32' are moved by the first and second frame index actuators 35 and 38 between the first and second positions. Accordingly, when using the movable frame indexes 31' and 32', the position of each of the movable frame indexes 31' and 32' can be readily switched between the first position and the second position in accordance with the shear tie arrangement pattern.

Still further, in the present embodiment, the first and second stringer indexes 71 and 72 are moved by the first and second stringer index actuators 73 and 74 between the engagement and non-engagement positions. Accordingly, the stringer indexes to use can be readily switched between the first stringer indexes 71 and the second stringer indexes 72 in accordance with the stringer arrangement pattern.

Still further, in the present embodiment, the first and second edge indexes 61 and 62 are moved by the first and second edge index actuators 64 and 65 between the contact and non-contact positions. Accordingly, the edge indexes to use can be readily switched between the first edge indexes 61 and the second edge indexes 62 in accordance with the skin edge pattern.

Still further, in the present embodiment, each side beam 21 is provided with the electric cylinders 24. Therefore, even in a case where the distance between the header plates 41 is great, end portions of the aircraft fuselage panel 11 can be kept in a desirable shape.

When disposing the receiving members 51 at the design positions by operating the aforementioned electric cylinders 5, it is desirable to adopt a method described below.

Figure 10:
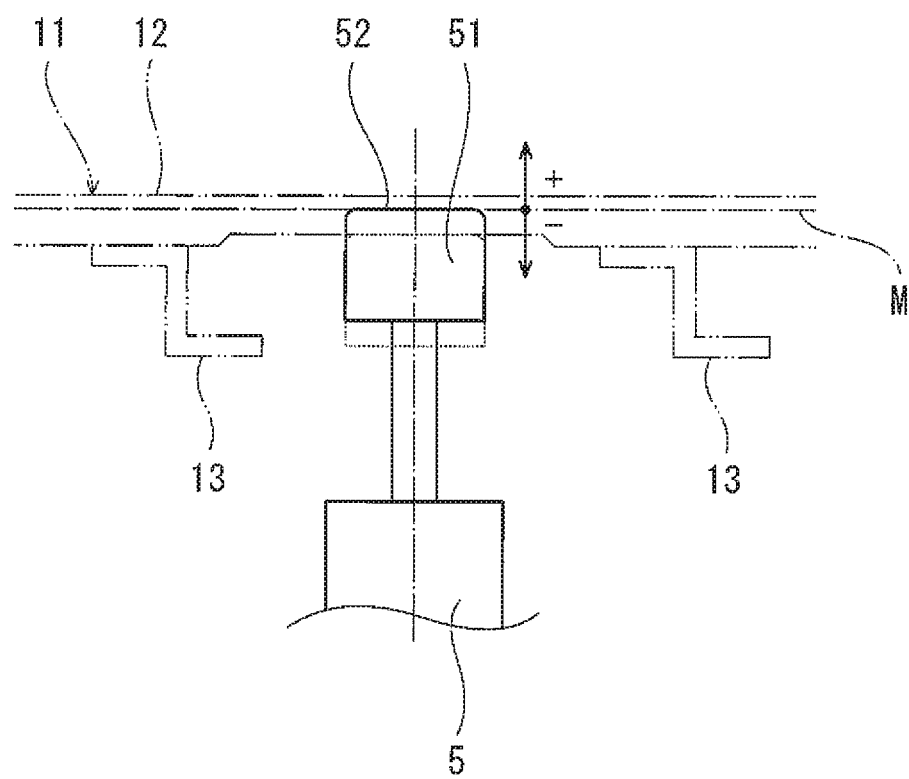
FIG. 10 illustrates a method of determining the origin of each electric cylinder.

First, as shown in FIG. 10, while measuring the receiving surfaces 52 of the respective receiving members 51 by using a laser tracker, the electric cylinders 5 are operated to determine the origin of each electric cylinder 5, such that the receiving surfaces 52 of all the receiving members 51 are positioned on a reference cylindrical surface M. The reference cylindrical surface M is an imaginary surface that defines the diameter of the aircraft fuselage. Then, each electric cylinder 5 is driven from the origin by a predetermined stroke, and thereby the receiving members 51 are moved to the respective design positions.

According to the above method, the positions of the receiving surfaces 52 of the receiving members 51 are assured by the precision of the strokes of the electric cylinders 5. Therefore, it is not necessary to measure, by using the laser tracker, the receiving surfaces 52 of the receiving members 51 moved to the design positions each time the aircraft fuselage panel 11 is changed. Thus, the cost for the assurance of final assembling precision of a panel assembly can be reduced.

The aircraft fuselage assembling jig 2 requires regular inspection for precision assurance. Assume that, at the regular inspection, the receiving surfaces 52 of the receiving members 51 are measured by using the laser tracker in a state where the electric cylinders 5 are each returned to the origin. In this case, each time the regular inspection is performed, the inspection requires a very high cost, because the measurement of a surface requires the measurement of at least three points on the surface. In this respect, the cost for the regular inspection can be reduced by adopting a method described below.

First, when determining the aforementioned origin of each electric cylinder 5, the position of the target bushing 53 embedded in the side surface of the receiving member 51 is measured by using the laser tracker. Then, the measured position of the target bushing 53 is recorded as a reference position.

At the regular inspection, after each electric cylinder 5 is moved to the origin, the position of the target bushing 53 is measured by using the laser tracker. The measured position of the target bushing 53 is compared with the reference position of the target bushing 53, which is recorded when determining the origin. Adopting this method makes it possible to significantly reduce the number of times of three-dimensional measurement that is performed by using the laser tracker at the regular inspection.

(Variations)

The present invention is not limited to the above-described embodiment. Various modifications can be made without departing from the spirit of the present invention.

For example, the center beam 22 and the second frame indexes 32 can be eliminated depending on the positions of the first frame indexes 31.

The aircraft fuselage assembling jig 2 is not necessarily a horizontal type jig, but may be a vertical type jig. That is, the header plates 41 may protrude laterally from the base 20. However, in a case where the header plates 41 protrude laterally from the base 20, the aircraft fuselage panel set on the aircraft fuselage assembling jig 2 is in an upright standing state. In this case, the lower part of the aircraft fuselage panel deforms due to the weight of the aircraft fuselage panel, and for this reason, the skin of the lower part of the aircraft fuselage panel does not contact the receiving members. Therefore, it is necessary to use a band or the like to correct the deformation of the aircraft fuselage panel so as to bring the skin into contact with the receiving members. On the other hand, in a case where the header plates 41 protrude upward from the base 20, the aircraft fuselage panel set on the aircraft fuselage assembling jig is in a laid-down state. Accordingly, the weight of the aircraft fuselage panel brings the overall skin into contact with the receiving members. Thus, in this case, deformation correction of the aircraft fuselage panel is unnecessary.

The frame index actuators 35 and 38 may be eliminated; and each of the movable frame indexes 31' and 32' may be manually moved between the first position and the second position, and may be fixed at the first position or the second position by a bolt or the like. Similarly, the first and second stringer index actuators 73 and 74 may be eliminated; and each of the first and second stringer indexes 71 and 72 may be manually moved between the engagement position and the non-engagement position, and may be fixed at the engagement position or the non-engagement position by a bolt or the like. Similarly, the first and second edge index actuators 64 and 65 may be eliminated; and each of the first and second edge indexes 61 and 62 may be manually moved between the contact position and the non-contact position, and may be fixed at the contact position or the non-contact position by a bolt or the like.

The aircraft fuselage panel 11 may have three or more types of shear tie arrangement patterns. For example, in a case where the first and second frame index actuators 35 and 38 are electric cylinders, the movable frame indexes 31' and 32' can be moved to intended positions with high precision. In addition, the aircraft fuselage panel 11 may have three or more types of stringer arrangement patterns, and may have three or more types of skin edge patterns.

Alternatively, the aircraft fuselage panel 11 may have only one type of shear tie arrangement pattern, may have only one type of stringer arrangement pattern, and may have only one type of skin edge pattern. That is, all the first and second frame indexes 31 and 32 may be fixed-type frame indexes; fixed-type stringer indexes may be adopted instead of the first and second stringer indexes 71 and 72; and fixed-type edge indexes may be adopted instead of the first and second edge indexes 61 and 62.

REFERENCE SIGNS LIST 11 aircraft fuselage panel
12 skin
13 stringer
14 shear tie
15 aircraft fuselage frame
2 aircraft fuselage assembling jig
20 base
21 side beam
24 electric cylinder
31, 32 frame index
31', 32' movable frame index
35, 38 frame index actuator
41 header plate
5 electric cylinder
51 receiving member
52 receiving surface
53 target bushing
61 first edge index
62 second edge index
64 first edge index actuator
65 second edge index actuator
71 first stringer index
72 second stringer index
73 first stringer index actuator
74 second stringer index actuator
M reference cylindrical surface

The invention claimed is:

1. An aircraft fuselage assembling jig comprising:
a base including a plurality of side beams and a plurality of frame indexes separately located on each side beam of the plurality of sides beams of the base in a width direction of the base, the plurality of frame indexes being attached to only each respective side beam of the plurality of side beams and being configured to position respective first and second side ends of a plurality of aircraft fuselage frames in the width direction of the base;
a plurality of header plates extending across the base in the width direction, which is perpendicular to an axial direction of an aircraft fuselage panel, each of the plurality of header plates being respectively separated from each of the plurality of frame indexes along each respective side beam of the base, each of plurality of header plates protrudes from the base so as to extend along the aircraft fuselage panel, the plurality of header plates being arranged parallel to each other in the axial direction of the aircraft fuselage panel; and
a plurality of electric cylinders radially provided on each of the plurality of header plates, the plurality of electric cylinders moving respective receiving members in a radial direction of the aircraft fuselage panel, the receiving members contacting a skin included in the aircraft fuselage panel.

2. The aircraft fuselage assembling jig according to claim 1, wherein
the aircraft fuselage panel has at least two types of shear tie arrangement patterns, and
the plurality of frame indexes include a plurality of movable frame indexes, each of which moves in the axial direction of the aircraft fuselage panel between a first position and a second position, the first position corresponding to one of the two types of shear tie arrangement patterns, the second position corresponding to the other type of shear tie arrangement pattern.

3. The aircraft fuselage assembling jig according to claim 2, wherein the base includes a pair of side beams extending in the axial direction of the aircraft fuselage panel, the pair of side beams being provided with the plurality of frame indexes, and each of the pair of side beams is provided with at least one frame index actuator that moves the plurality of movable frame indexes between the first position and the second position.

4. The aircraft fuselage assembling jig according to claim 1, wherein the aircraft fuselage panel has at least two types of stringer arrangement patterns, and at least one of the plurality of header plates is provided with:

a first stringer index that moves between an engagement position and a non-engagement position, the engagement position being a position at which the first stringer index engages with one stringer in one of the two types of stringer arrangement patterns; and a second stringer index that moves between an engagement position and a non-engagement position, the engagement position being a position at which the second stringer index engages with one stringer in the other type of stringer arrangement pattern.

5. The aircraft fuselage assembling jig according to claim 4, wherein at least one of the plurality of header plates is provided with:

a first stringer index actuator that moves the first stringer index between the engagement position and the non-engagement position; and a second stringer index actuator that moves the second stringer index between the engagement position and the non-engagement position.

6. The aircraft fuselage assembling jig according to claim 1, further comprising an end plate that protrudes to an outside of the aircraft fuselage panel from the base so as to extend along the aircraft fuselage panel, wherein:

the aircraft fuselage panel has at least two types of skin edge patterns, and the end plate is provided with:

a first edge index that moves between a contact position and a non- contact position, the contact position being a position at which the first edge index contacts an edge of the skin in one of the two types of skin edge patterns; and a second edge index that moves between a contact position and a non- contact position, the contact position being a position at which the second edge index contacts the edge of the skin in the other type of skin edge pattern.

7. The aircraft fuselage assembling jig according to claim 6, wherein the end plate is provided with:

a first edge index actuator that moves the first edge index between the contact position and the non-contact position; and a second edge index actuator that moves the second edge index between the contact position and the non-contact position.

8. The aircraft fuselage assembling jig according to claim 1, wherein the plurality of header plates protrude upward from the base.

9. The aircraft fuselage assembling jig according to claim 8, further comprising an electric cylinder provided on the base, the electric cylinder of the base correcting deflection of an end portion of the aircraft fuselage panel between the plurality of header plates.

10. A method of using the aircraft fuselage assembling jig according to claim 1, the method comprising:

while measuring receiving surfaces of the respective receiving members by using a laser tracker, determining an origin of each of the plurality of electric cylinders by operating the plurality of electric cylinders, such that the receiving surfaces of all the receiving members are positioned on an imaginary reference cylindrical surface that defines a diameter of the aircraft fuselage; and moving the receiving members to respective design positions by driving each of the plurality of electric cylinders from the origin by a predetermined stroke.

11. The method of using the aircraft fuselage assembling jig according to claim 10, wherein a target bushing is embedded in a side surface of each receiving member, in the step of determining the origin of each electric cylinder, a position of the target bushing is measured by using the laser tracker, and the measured position of the target bushing is recorded as a reference position, and the method comprises, at regular inspection, after moving each of the plurality of electric cylinders to the origin, measuring the position of the target bushing by using the laser tracker, and comparing the measured position of the target bushing with the reference position of the target bushing, which is recorded when determining the origin.

* * * * *